United States Patent
Höglund et al.

(10) Patent No.: US 11,343,767 B2
(45) Date of Patent: May 24, 2022

(54) SYSTEMS AND METHODS PROVIDING AN IDLE EARLY DATA TRANSMISSION SOLUTION ACCOMMODATING POWER-SAVING MODE

(71) Applicant: Telefonaktiebolaget LM Ericsson (publ), Stockholm (SE)

(72) Inventors: Andreas Höglund, Solna (SE); Magnus Karlsson, Lund (SE); Tuomas Tirronen, Helsinki (FI); Mikael Wass, Sätila (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/649,746

(22) PCT Filed: Sep. 28, 2018

(86) PCT No.: PCT/IB2018/057562
§ 371 (c)(1),
(2) Date: Mar. 23, 2020

(87) PCT Pub. No.: WO2019/064260
PCT Pub. Date: Apr. 4, 2019

(65) Prior Publication Data
US 2020/0245242 A1 Jul. 30, 2020

Related U.S. Application Data

(60) Provisional application No. 62/565,790, filed on Sep. 29, 2017.

(51) Int. Cl.
*H04W 52/02* (2009.01)
*H04W 76/38* (2018.01)
(Continued)

(52) U.S. Cl.
CPC ... *H04W 52/0216* (2013.01); *H04W 74/0833* (2013.01); *H04W 76/27* (2018.02); *H04W 76/38* (2018.02)

(58) Field of Classification Search
None
See application file for complete search history.

(56) References Cited

U.S. PATENT DOCUMENTS 9,730,156 B1 * 8/2017 Chamarty ............... H04L 67/16
10,194,393 B2 * 1/2019 Haneji .............. H04W 52/0212
(Continued)

OTHER PUBLICATIONS

3GPP TSG-RAN WG2 Meeting #99bis; Prague, Czechia; Source: Qualcomm Incorporated; Title: Email discussion report: [99#45][NB-IoT/MTC] Eady data transmission (R2-1710888)—Oct. 9-13, 2017.
(Continued)

*Primary Examiner* — Faruk Hamza
(74) *Attorney, Agent, or Firm* — Baker Botts, LLP

(57) ABSTRACT

According to certain embodiments, a method includes determining that at least one condition is met while a wireless device is in a power saving mode (PSM) and no non-access stratum (NAS) connection is established. In response to determining that the at least one condition is met and while no NAS connection is established, a timer is set to an initial value and restarted with the initial value.

26 Claims, 12 Drawing Sheets

(51) Int. Cl.
*H04W 76/27* (2018.01)
*H04W 74/08* (2009.01)

(56) References Cited

U.S. PATENT DOCUMENTS

| | | | | |
|---|---|---|---|---|
| 10,736,171 | B2* | 8/2020 | Lee | H04W 52/0216 |
| 10,924,912 | B2* | 2/2021 | Kim | H04W 48/08 |
| 2010/0205232 | A1* | 8/2010 | Moriwake | G06F 3/067 707/E17.01 |
| 2011/0194505 | A1* | 8/2011 | Faccin | H04W 48/18 370/329 |
| 2011/0300828 | A1* | 12/2011 | Wass | H04W 12/02 455/410 |
| 2012/0281566 | A1* | 11/2012 | Pelletier | H04W 76/27 370/252 |
| 2012/0294169 | A1* | 11/2012 | Chui | H04W 52/02 370/252 |
| 2014/0016614 | A1* | 1/2014 | Velev | H04W 76/38 370/331 |
| 2014/0056198 | A1* | 2/2014 | Quan | H04W 52/0216 370/311 |
| 2014/0247762 | A1* | 9/2014 | Al | H04W 52/0235 370/311 |
| 2015/0163739 | A1* | 6/2015 | Fan | H04W 72/1278 370/311 |
| 2015/0327170 | A1* | 11/2015 | Kim | H04W 52/0216 455/574 |
| 2015/0373764 | A1* | 12/2015 | Yu | H04W 28/16 370/338 |
| 2016/0044578 | A1* | 2/2016 | Vajapeyam | H04W 52/0216 370/252 |
| 2016/0044605 | A1* | 2/2016 | Vajapeyam | H04W 52/322 370/311 |
| 2016/0073285 | A1* | 3/2016 | Graham | H04W 76/27 370/328 |
| 2016/0081022 | A1* | 3/2016 | Haneji | H04W 76/28 370/311 |
| 2016/0100362 | A1* | 4/2016 | Palanisamy | H04W 52/0212 370/311 |
| 2016/0198340 | A1* | 7/2016 | Joung | H04W 36/00835 370/329 |
| 2016/0205630 | A1* | 7/2016 | Chen | H04W 52/0251 455/574 |
| 2016/0302153 | A1* | 10/2016 | Martin | H04W 40/005 |
| 2017/0041873 | A1* | 2/2017 | Wu | H04W 4/70 |
| 2017/0064770 | A1* | 3/2017 | Patwardhan | H04W 76/28 |
| 2017/0086062 | A1* | 3/2017 | Chen | H04W 76/12 |
| 2017/0094027 | A1* | 3/2017 | Zhou | G06Q 10/04 |
| 2017/0230817 | A1* | 8/2017 | Ryu | H04W 8/04 |
| 2017/0245213 | A1* | 8/2017 | Martinez Tarradell | H04L 5/0048 |
| 2018/0084486 | A1* | 3/2018 | Pradas | H04W 24/10 |
| 2018/0098311 | A1* | 4/2018 | Hong | H04M 1/724 |
| 2018/0124864 | A1* | 5/2018 | Lee | H04W 52/0216 |
| 2018/0152924 | A1* | 5/2018 | Ouchi | H04W 72/0453 |
| 2018/0263012 | A1* | 9/2018 | Ryu | H04W 68/02 |
| 2018/0270188 | A1* | 9/2018 | Kodaypak | H04L 63/0428 |
| 2018/0295612 | A1* | 10/2018 | Yi | H04B 1/7156 |
| 2018/0310143 | A1* | 10/2018 | Yang | H04W 68/005 |
| 2018/0324869 | A1* | 11/2018 | Phuyal | H04W 72/14 |
| 2018/0359803 | A1* | 12/2018 | Haneji et al. | H04W 76/34 |
| 2019/0007329 | A1* | 1/2019 | Velev | H04L 47/266 |
| 2019/0014530 | A1* | 1/2019 | Aghili | H04W 28/12 |
| 2019/0014612 | A1* | 1/2019 | Lee | H04W 76/16 |
| 2019/0021064 | A1* | 1/2019 | Ryu | H04W 76/27 |
| 2019/0037377 | A1* | 1/2019 | Ke | H04L 67/16 |
| 2019/0037441 | A1* | 1/2019 | Liu | H04W 4/70 |
| 2019/0045349 | A1* | 2/2019 | Kim | H04W 76/20 |
| 2019/0053157 | A1* | 2/2019 | Lin | H04W 52/0216 |
| 2019/0053324 | A1* | 2/2019 | Tseng | H04W 76/30 |
| 2019/0058711 | A1* | 2/2019 | Zhu | H04L 67/306 |
| 2019/0090186 | A1* | 3/2019 | Ramle | H04W 4/70 |
| 2019/0141515 | A1* | 5/2019 | Kim | H04W 52/0229 |
| 2019/0159077 | A1* | 5/2019 | Ryu | H04W 36/0033 |
| 2019/0349852 | A1* | 11/2019 | Watfa | H04W 4/08 |
| 2020/0037345 | A1* | 1/2020 | Ryoo | H04W 76/27 |
| 2020/0037368 | A1* | 1/2020 | Hoglund | H04W 72/14 |
| 2020/0128463 | A1* | 4/2020 | Reddiboyana | H04W 76/15 |
| 2020/0178076 | A1* | 6/2020 | Ben Henda | H04L 63/12 |
| 2020/0187088 | A1* | 6/2020 | Chun | H04L 69/322 |
| 2020/0187245 | A1* | 6/2020 | Fujishiro | H04W 74/0833 |
| 2020/0221527 | A1* | 7/2020 | Bharatia | H04W 60/00 |
| 2020/0228987 | A1* | 7/2020 | Ben Henda | H04W 12/10 |
| 2020/0236627 | A1* | 7/2020 | Jia | H04W 52/0203 |
| 2020/0245242 | A1* | 7/2020 | Hoglund | H04W 76/27 |
| 2020/0304985 | A1* | 9/2020 | Gupta | H04W 80/10 |

OTHER PUBLICATIONS

PCT International Search Report for International application No. PCT/IB2018/057562—Nov. 29, 2018.

PCT Written Opinion of the International Searching Authority for International application No. PCT/IB2018/057562—Nov. 29, 2018.

* cited by examiner ns and methods for an idle early data transmission (EDT) solution that accommodates power-saving mode.

SYSTEMS AND METHODS PROVIDING AN IDLE EARLY DATA TRANSMISSION SOLUTION ACCOMMODATING POWER-SAVING MODE

PRIORITY

This nonprovisional application is a U.S. National Stage Filing under 35 U.S.C. § 371 of International Patent Application Serial No. PCT/IB2018/057562 filed Sep. 28, 2018 and entitled "SYSTEMS AND METHODS PROVIDING AN IDLE EARLY DATA TRANSMISSION SOLUTION ACCOMMODATING POWER-SAVING MODE" which claims priority to U.S. Provisional Patent Application No. 62/565,790 filed Sep. 29, 2017 both of which are hereby incorporated by reference in their entirety.

TECHNICAL FIELD

The present disclosure relates, in general, to wireless communications and, more particularly, systems and methods providing an idle early data transmission (EDT) solution that accommodates power-saving mode.

BACKGROUND

Recently, there has been a great deal of focus in 3GPP on specifying technologies to cover Machine-to-Machine (M2M) and/or Internet of Things (IoT) related use cases. Most recent work for 3GPP Release 13 and 14 include enhancements to support Machine-Type Communications (MTC) with new user equipment (UE) categories (Cat-M1, Cat-M2), supporting reduced bandwidth of up to 6 and 24 physical resource blocks (PRBs), and Narrowband IoT (NB-IoT) UEs, providing a new radio interface and UE categories (Cat-NB1 and Cat-NB2).

Herein, the LTE enhancements introduced in 3GPP Release 13, 14 and 15 for MTC will be referred to as "eMTC" and this term will be considered to include (but not be limited to) the support for bandwidth limited UEs (Cat-M1) and the support for coverage enhancements. The supported features are similar on a general level to enhancements to NB-IoT (for any Release).

There are multiple differences between legacy LTE and the procedures and channels defined for eMTC. Likewise, there are multiple differences between legacy LTE and the procedures and channels defined for NB-IoT. Some important differences include new physical channels, such as the physical downlink control channels, called MPDCCH in eMTC and NPDCCH in NB-IoT. Another important difference includes a new physical random access channel, NPRACH, for NB-IoT.

For 3GPP Release 15, new work items titled "Even further enhanced MTC for LTE (LTE_efeMTC)" (hereinafter, "WI_eMTC") and "Further NB-IoT enhancements (NB_IOTfenh)" (hereinafter, "WI_NBIOT") target eMTC and NB-IoT enhancements, respectively. In both of the work items, a goal is to reduce UE power consumption and latency by introducing the possibility of sending data as early as possible during the Random Access procedure. For example, WI_eMTC discloses support for early data transmission (EDT) [RAN2 lead, RAN1, RAN3]:

Evaluate power consumption/latency gain and specify necessary support for [downlink/uplink (DL/UL)] data transmission on a dedicated resource during the Random Access procedure (after [physical random access channel (PRACH)] transmission and before the [radio resource control (RRC)] connection setup is completed) at least in the RRC Suspend/Resume case.

As another example, WI_NBIOT states:

Evaluate power consumption/latency gain and specify necessary support for DL/UL data transmission on a dedicated resource during the Random Access procedure after NPRACH transmission and before the RRC connection setup is completed. [RAN2, RAN1, RAN3]

As disclosed herein, such a feature, where data can be sent during Random Access procedure, will be called an "early data" feature, meaning that data can be sent earlier when compared to current LTE specifications (that is, after RRC connection setup or resume has been completed). This includes the case where data is multiplexed with RRCConnectionSetupComplete message.

FIG. 1 illustrates the contention-based Random Access (RA) procedure discussed in 3GPP TS36.300. The depicted transmissions (i.e., messages) are commonly referred to as message 1 through message 4. Specifically, in a message 1 (msg1), a UE transmits a RA preamble. In a message 2 (msg2), the eNode B (eNB) transmits the RA response. In a message 3 (msg3), the UE transmits a scheduled transmission. Finally, in a message 4 (msg4), the eNB transmits a contention resolution.

The currently specified RA and connection control procedures can be found in 3GPP TS36.321 and 3GPP TS36.331, which are incorporated by reference here in their entirety. The structure of medium access control (MAC) layer protocol data units (PDUs) are defined in 3GPP TS36.321, which is incorporated by reference here in its entirety. The structure of the grant included in the MAC random access response (RAR) is defined in 3GPP TS36.213, which is incorporated by reference here in its entirety. Power saving mode and non-access stratum (NAS) related procedures are described in 3GPP TS23.401 and 3GPP TS24.301, which are incorporated by reference here in their entirety.

The Rel-15, the EDT feature is intended for UE power consumption reductions. There has been some ongoing discussion and proposals related to an EDT scheme in which the UE does not complete the transition to connected state. However, the main use for such is uplink reporting of sensor devices and since these do not require downlink reachability they would typically be configured with power-saving mode (PSM). However, PSM will not work if the UE never enters a connected state.

SUMMARY

To address the foregoing problems with existing solutions, disclosed is systems and methods for RRC_IDLE early data transmission with power saving mode (PSM). Specifically, certain embodiments provide an "early data feature" wherein data may be sent earlier during an Random Access (RA) procedure than when compared to current LTE specifications, such as, for example, 3GPP TS36.321 and 3GPP TS36.331. For example, in a particular embodiment, data may be sent after an RRC connection setup or resume has been completed. In a particular embodiment, this includes the case where data is multiplexed with RRCConnectionSetupComplete message.

According to certain embodiments, a method includes determining that at least one condition is met while a wireless device is in a power saving mode (PSM) and no non-access stratum (NAS) connection is established. In response to determining that the at least one condition is met and while no NAS connection is established, a timer is set to an initial value and restarted with the initial value.

According to certain embodiments, a radio node includes memory storing instructions and processing circuitry operable to execute the instructions to cause the radio node to determine that at least one condition is met while a wireless device is in a power saving mode (PSM) and no network access stratum (NAS) signaling connection is established. In response to determining that the at least one condition is met and while no NAS signaling connection is established, a timer is set to an initial value and restarted at the initial value.

Certain embodiments of the present disclosure may provide one or more technical advantages. For example, certain embodiments may provide an idle early data solution that works in combination with power-saving mode.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Particular embodiments of the present disclosure may provide an idle early data transmission (EDT) solution that accommodates power saving mode (PSM). Certain embodiments, for example, provide an "early data feature" wherein data may be sent earlier during an Random Access (RA) procedure than when compared to current LTE specifications, such as, for example, 3GPP TS36.321 and 3GPP TS36.331. For example, in a particular embodiment, data may be sent after an RRC connection setup or resume has been completed. In a particular embodiment, this includes the case where data is multiplexed with RRCConnectionSetupComplete message. In particular embodiments, the proposed solutions add additional conditions for the start or stop of timer T3412 (periodic TAU timer) and timer T3324 (Active Time) to accommodate a wireless device in PSM.

Figure 1:
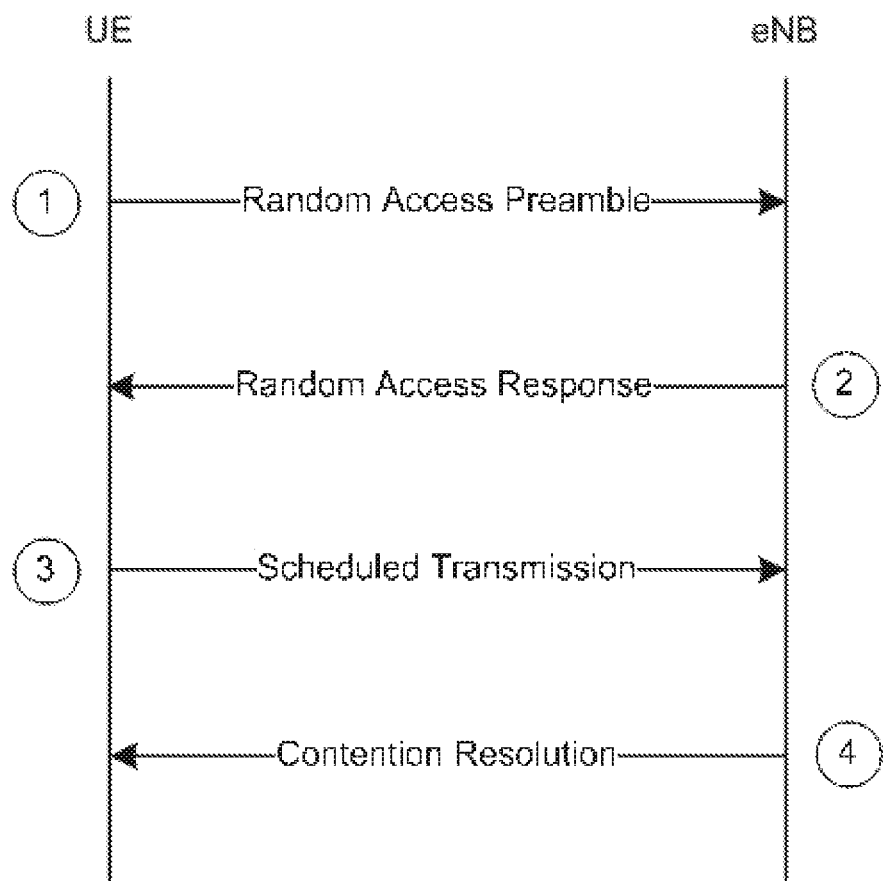
FIG. 1 illustrates the contention-based Random Access (RA) procedure.
Figure 2:
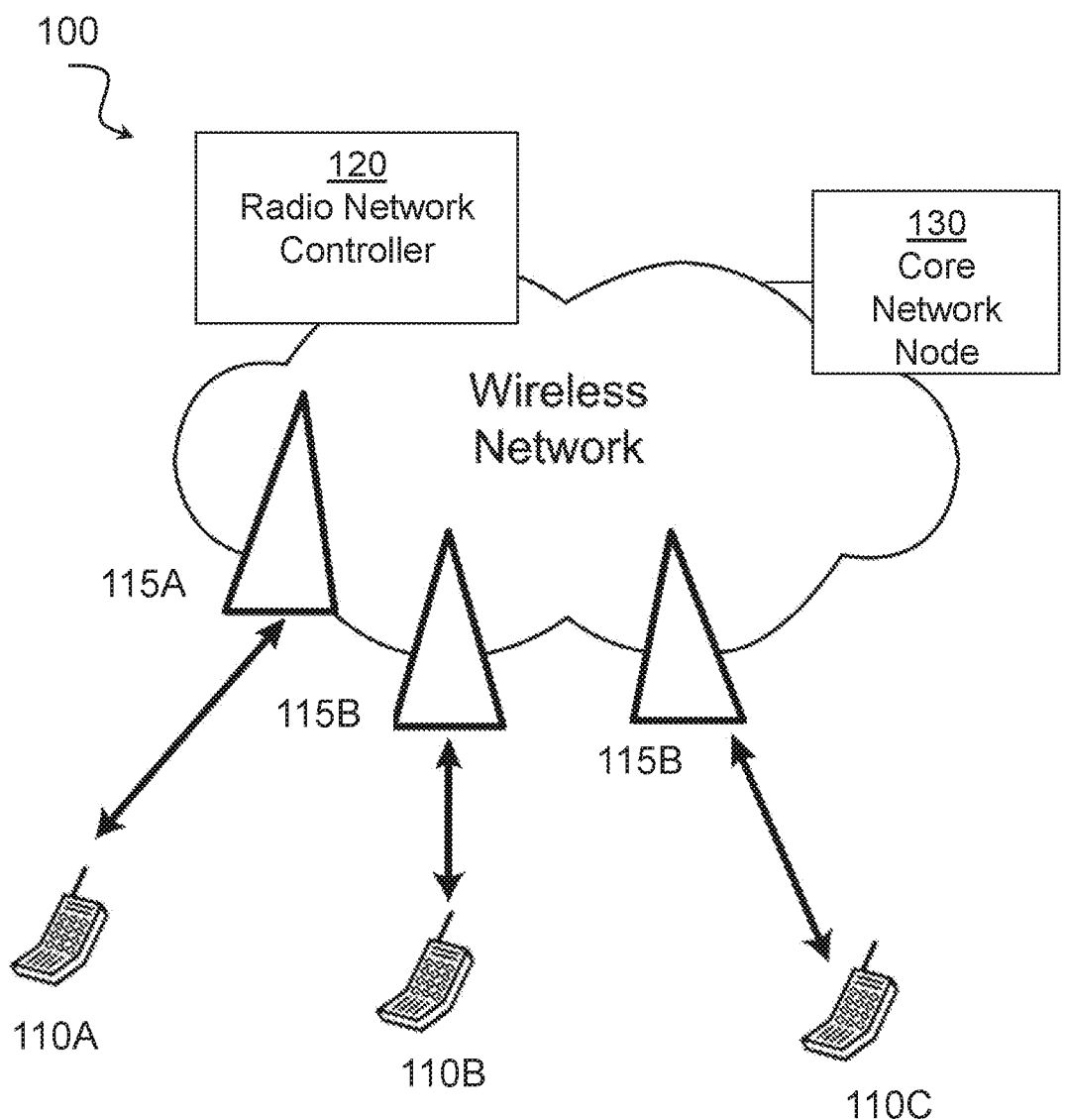
FIG. 2 illustrates an example wireless network providing an idle early data transmission (EDT) solution that accommodates power saving mode (PSM), according to certain embodiments.

Particular embodiments are described in FIGS. 1-10 of the drawings, like numerals being used for like and corresponding parts of the various drawings. FIG. 2 is a block diagram illustrating an embodiment of a network 100 providing an idle EDT solution that accommodates PSM, in accordance with certain embodiments. Network 100 includes one or more wireless devices 110A-C, which may be interchangeably referred to as wireless devices 110 or UEs 110, and network nodes 115A-C, which may be interchangeably referred to as network nodes 115 or eNodeBs 115, radio network controller 120, and a core network node 130. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller 120. Radio network controller 120 may control network nodes 115 and may provide certain radio resource management functions, mobility management functions, and/or other suitable functions. In certain embodiments, radio network controller 120 may interface with core network node 130 via an interconnecting network 125. The interconnecting network 125 may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Core network node 130 may manage the establishment of communication sessions and provide various other functionality for wireless communication device 110. Wireless communication device 110 exchanges certain signals with core network node 130 using the non-access stratum layer. In non-access stratum (NAS) signaling, signals between wireless communication device 110 and core network node 130 pass transparently through network nodes 120.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Each of wireless communication device 110, network node 115, radio network controller 120, and core network node 130 include any suitable combination of hardware and/or software. Example embodiments of network nodes 115, wireless devices 110, and other network nodes (such as radio network controller or core network node) are described in more detail with respect to FIGS. 3, 4, and 10, respectively.

Although FIG. 2 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). In certain embodiments, wireless communication device 110, network node 120, and core network node 130 use any suitable radio access technology, such as long term evolution (LTE), LTE-Advanced, UMTS, HSPA, GSM, cdma2000, WiMax, WiFi, another suitable radio access technology, or any suitable combination of one or more radio access technologies. For purposes of example, various embodiments may be described within the context of certain radio access technologies. However, the scope of the disclosure is not limited to the examples and other embodiments could use different radio access technologies.

Figure 3:
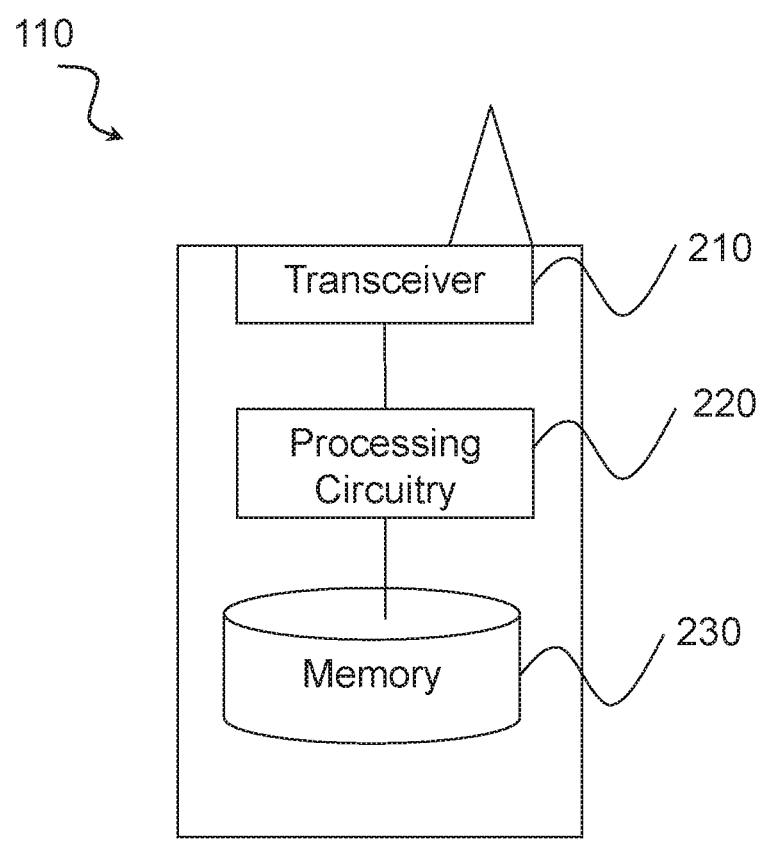
FIG. 3 illustrates an example wireless device providing an idle EDT solution that accommodates PSM, according to certain embodiments.

FIG. 3 illustrates an example wireless device 110 providing an idle EDT solution that accommodates PSM, in accordance with certain embodiments. As depicted, wireless device 110 includes transceiver 210, processing circuitry 220, and memory 230. In some embodiments, transceiver 210 facilitates transmitting wireless signals to and receiving wireless signals from network node 115 (e.g., via an antenna), processing circuitry 220 executes instructions to provide some or all of the functionality described above as being provided by wireless device 110, and memory 230 stores the instructions executed by processing circuitry 220. Examples of a wireless device 110 are provided above.

Processing circuitry 220 may include any suitable combination of hardware and software implemented in one or more modules to execute instructions and manipulate data to perform some or all of the described functions of wireless device 110. In some embodiments, processing circuitry 220 may include, for example, one or more computers, one or more central processing units (CPUs), one or more microprocessors, one or more applications, and/or other logic.

Memory 230 is generally operable to store instructions, such as a computer program, software, an application including one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 3 that may be responsible for providing certain aspects of the wireless device's functionality, including any of the functionality described above and/or any additional functionality (including any functionality necessary to support the solution described above).

Figure 4:
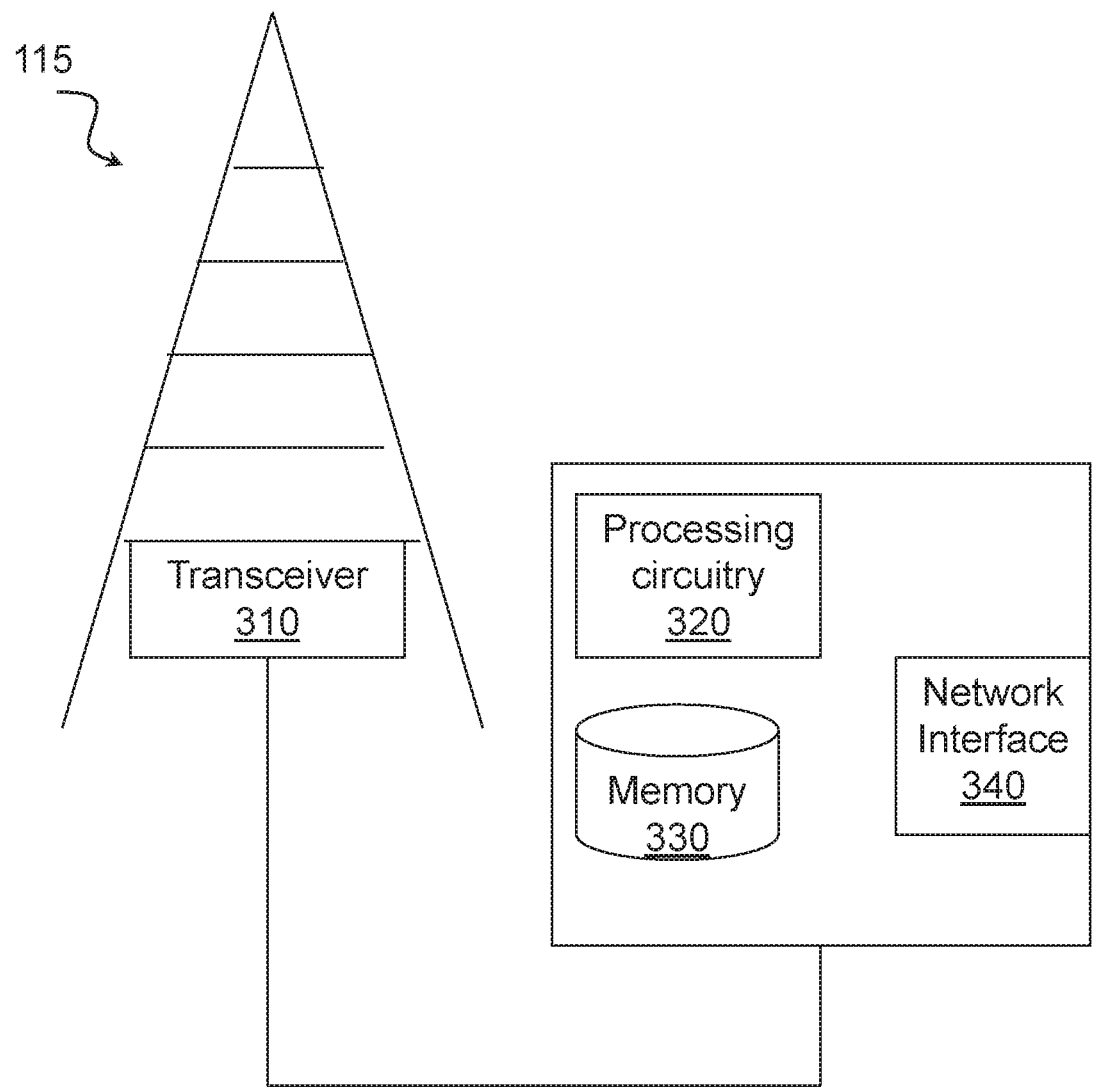
FIG. 4 illustrate an example network node providing an idle EDT solution that accommodates PSM, according to certain embodiments.

FIG. 4 illustrate an example network node 115 providing an idle EDT solution that accommodates PSM, according to certain embodiments. As described above, network node 115 may be any type of radio network node or any network node that communicates with a wireless device and/or with another network node. Examples of a network node 115 are provided above.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 310, processing circuitry 320, memory 330, and network interface 340. In some embodiments, transceiver 310 facilitates transmitting wireless signals to and receiving wireless signals from wireless device 110 (e.g., via an antenna), processing circuitry 320 executes instructions to provide some or all of the functionality described above as being provided by a network node 115, memory 330 stores the instructions executed by processing circuitry 320, and network interface 340 communicates signals to backend network components, such as a gateway, switch, router, Internet, Public Switched Telephone Network (PSTN), core network nodes or radio network controllers, etc.

In certain embodiments, network node 115 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processing circuitry 320 may include any suitable combination of hardware and software implemented in one or more modules to execute instructions and manipulate data to perform some or all of the described functions of network node 115. In some embodiments, processing circuitry 320 may include, for example, one or more computers, one or more central processing units (CPUs), one or more microprocessors, one or more applications, and/or other logic.

Memory 330 is generally operable to store instructions, such as a computer program, software, an application including one or more of logic, rules, algorithms, code, tables, etc. and/or other instructions capable of being executed by a processor. Examples of memory 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 340 is communicatively coupled to processing circuitry 320 and may refer to any suitable device operable to receive input for network node 115, send output from network node 115, perform suitable processing of the input or output or both, communicate to other devices, or any combination of the preceding. Network interface 340 may include appropriate hardware (e.g., port, modem, network interface card, etc.) and software, including protocol conversion and data processing capabilities, to communicate through a network.

Other embodiments of network node 115 may include additional components beyond those shown in FIG. 4 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

Figure 5:
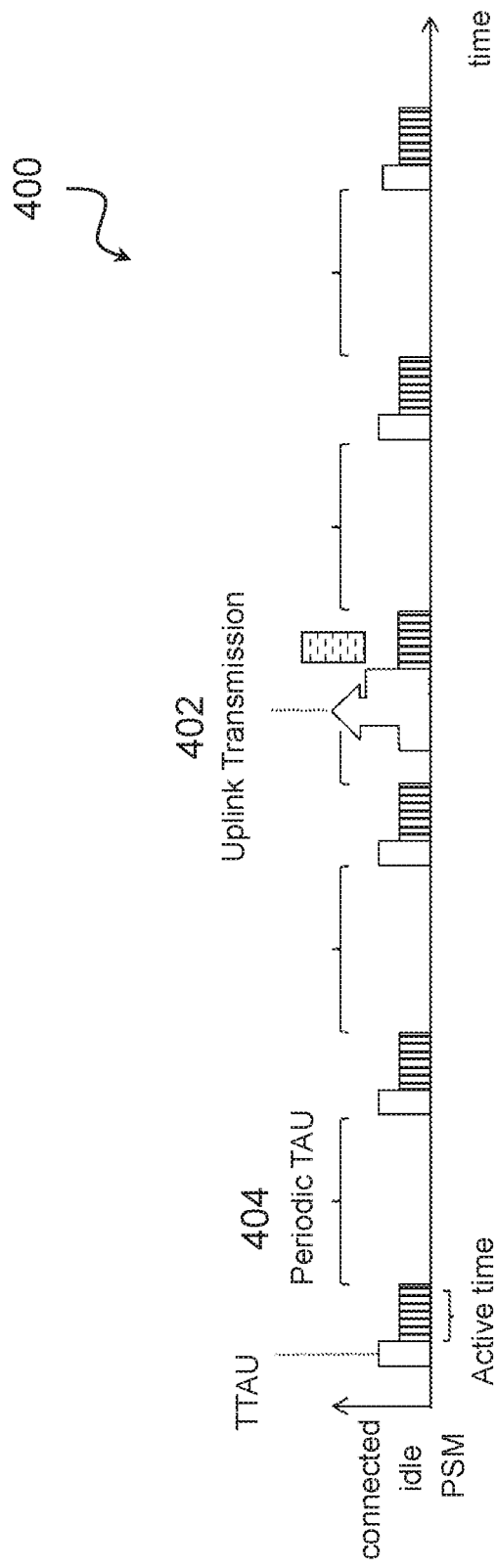
FIG. 5 illustrates an example timing diagram for PSM, according to certain embodiments.

According to certain embodiments, wireless device 110 may operate in PSM. FIG. 5 illustrates an example timing diagram 400 for PSM, according to certain embodiments. PSM was introduced in 3DPP Release 12 and is a feature which can provide very long battery life for wireless devices 100 with infrequent data exchange and no need for quick downlink reachability. PSM works by, for most of the time, keeping the wireless device 110 in a power efficient sub-state to RRC_IDLE in which all AS functionality is switched off. It is almost a power-off but no re-attach is needed. After a connection, the wireless device 110 will be sent to this power saving state after a certain time in RRC_IDLE mode, controlled by the configurable parameter the Active Time (T3324), and the wireless device will return from this state either upon uplink (UL) data transmission 402 or periodic Tracking Area Update (TAU) (T3412).

PSM is activated by the wireless device 110 requesting an Active Time (timer T3324) during periodic TAU 404. This may be referred to as a TAU request. The network accepts by assigning a T3324 value to the wireless device, which is transmitted in a TAU accept messages. In addition, the wireless device can also request an (extended) value for the periodic TAU timer T3412.

Figure 6A:
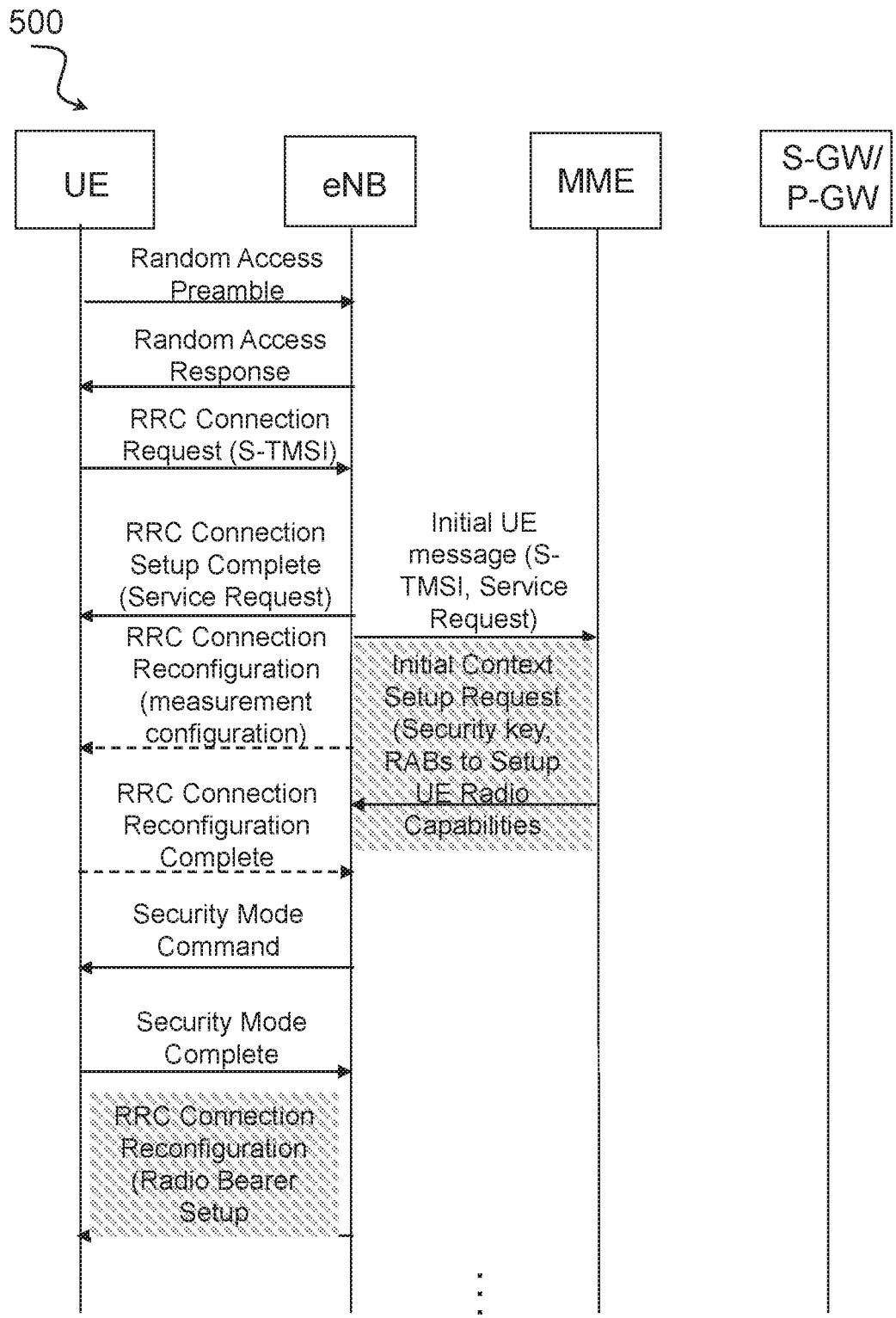
FIGS. 6A-6B illustrate an example signaling diagram for a Radio Resource Control (RRC) Connection Establishment, according to certain embodiments.
Figure 6B:
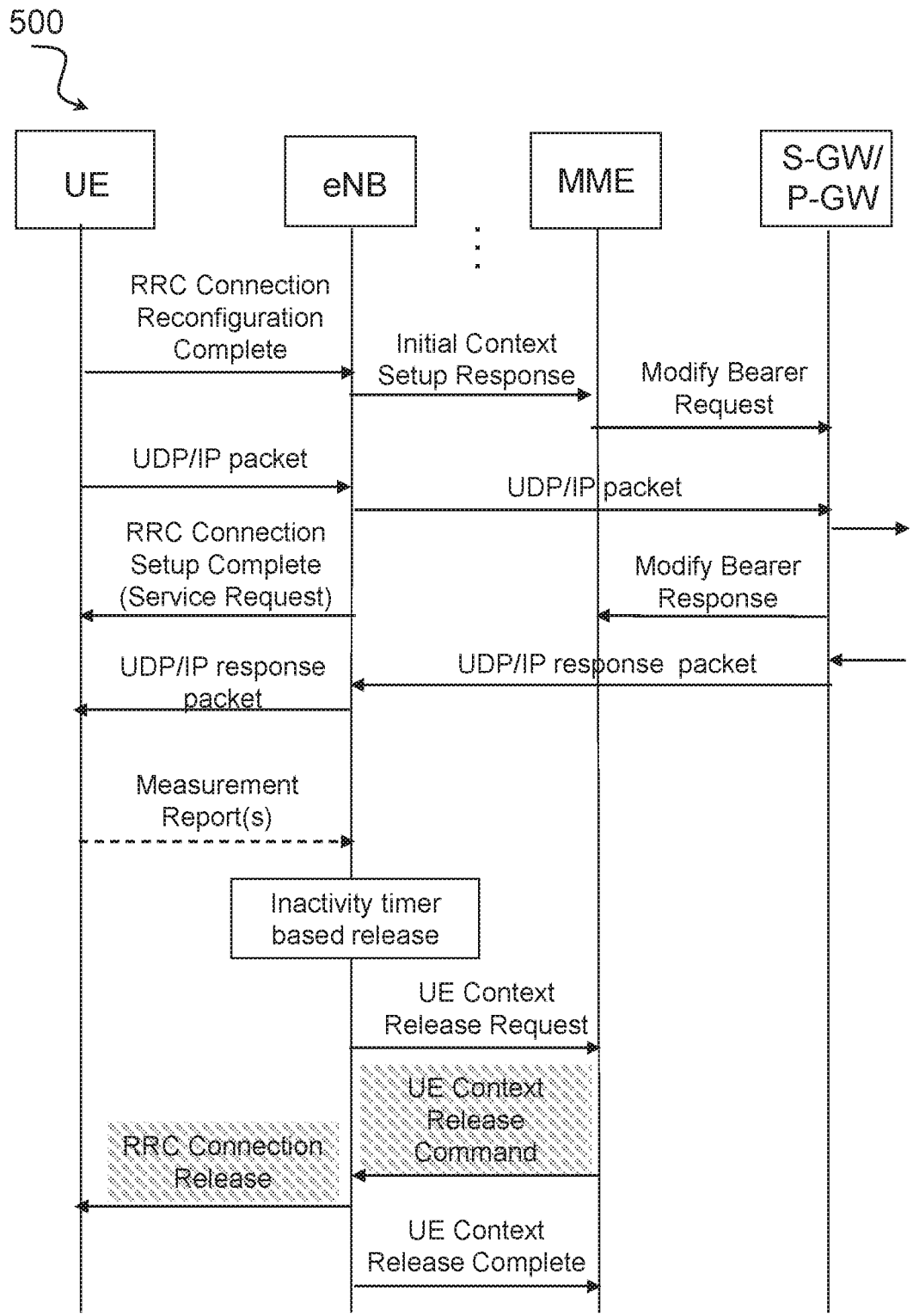

According to certain embodiments, an RRC connection may be established between wireless device 110 and network node 115. FIGS. 6A-6B illustrate example signaling 500 for an RRC Connection Establishment, according to certain embodiments.

PSM relies on starting and stopping timers T3324 and T3412 when the wireless device switches between EMM_CONNECTED and EMM_IDLE mode, i.e. S1 (mobile management entity (MME) to eNB) connected state. Typically, the S1 connection will be released at the same time as the RRC connection (UE to eNB) and therefore the UE is most often in EMM_CONNECTED at the same time as it is in RRC_CONNECTED. As used herein, EMM may refer to Evolved Packet System (EPS) Mobility Management (EMM).

Current operation from 3GPP TS 24.301 include:
Periodic TAU:
"Timer T3412 is reset and started with its initial value, when the UE changes from EMM-CONNECTED to EMM-IDLE mode"
Active Time:
" . . . timer T3324 is reset and started with its initial value, when the MS changes from EMM-CONNECTED mode to EMM-IDLE mode. Timer T3324 is stopped when the MS enters EMM-CONNECTED mode or EMM-DEREGISTERED state"

According to certain embodiments, a solution is provided that introduces additional conditions for the start and stop of timers T3412 and T3324. The additional conditions ensure that the timers are restarted and that PSM works also with the EDT feature.

According to certain embodiments, one example of such conditions is given below where added functionality is shown as italic and underlined:
Periodic TAU:
"Timer T3412 is reset and started with its initial value, when the UE changes from EMM-CONNECTED to EMM-IDLE mode, *or when NAS transmission is successfully completed but no EMM connection was established.*"
Active Time:
" . . . timer T3324 is reset and started with its initial value, when the MS changes from EMM-CONNECTED mode to EMM-IDLE mode, *or when NAS transmission is successfully completed but no EMM connection was established.* Timer T3324 is stopped when the MS enters EMM-CONNECTED mode or EMM-DEREGISTERED state, *or when NAS transmission is initiated but no EMM connection is established.*"

That is, even though the wireless device is never entering a connected state the T3412 and T3324 timers are restarted and the UE continues to use PSM. As used herein, the terms EMM connection and NAS signaling connection may be used interchangeably. It may be understood that a wireless device that has a NAS signaling connection may be considered to be in an EMM-Connected mode or EMM-Connected state, as discussed by TS 24.301.

Other embodiments could restart T3412 and T3324 timers on (any combination of) the following:
Any NAS signaling related the early transmission of data.
An S1 NAS signaling connection between UE and MME is setup or released.
Successful transmission of S1-AP 'UE context release command'.
Successful transmission of S1-AP 'initial UE message' plus a timer value.
Triggered by Control Plane Service Request Message including a ESM Data Transport message.
Related to Service Accept
Any step of the Service Request procedure.
The UE enters or is released from any new EMM state.
Connected to RRC Resume or RRC Release with suspend cause for CIoT EPS UP Optimization Establishing or releasing RRC connection for CIoT EPS UP Optimization Release of AS for CIoT EPS UP Optimization Applying a timer of fixed time offset to any of the above.

According to certain other embodiments, a further example on wording is provided that takes into account possible indication from lower layers:

Periodic TAU:
"Timer T3412 is reset and started with its initial value, when the UE changes from EMM-CONNECTED to EMM-IDLE mode, or when the service request procedure is successfully completed upon indication from the lower layers that the RRC connection has been released."

or

"Timer T3412 is reset and started with its initial value, when the UE changes from EMM-CONNECTED to EMM-IDLE mode, or when lower layers indicate that early data transmission has been completed and the transition to RRC_CONNECTED was not completed."

Other embodiments may use a similar way, where an indication is used to inform MME about a completed procedure but where the wireless device did or does not transition to RRC, EPS Connection Management (ECM) or EMM connected mode. Similar alternatives can apply for the resetting, starting and stopping of T3324.

According to certain embodiments, a wireless device or network node may separately indicate the MME RRC connection has been released. For EDT, it may be also possible that the wireless device does not actually make the full transition to RRC_CONNECTED but finishes data transaction or transmission before the actual mode transition would happen. In this case, the indication to MME would make it clear the wireless device used EDT and did not transition to RRC_CONNECTED, and remains in RRC_IDLE after the procedure. With such indication it would be possible to trigger Active Time (timer T3324) so that the wireless device would be reachable for paging during T3324. Additionally or alternatively, the periodic TAU timer T3412 would be reset so that the UE would not need to transmit periodic tracking area updates in order to save power.

According to certain embodiments, the EDT is planned to work with both User Plane (UP) and Control Plane (CP) CIoT EPS optimizations, that is, when the data from wireless device is transmitted while using RRC Resume/Suspend procedures or when the data is encapsulated in NAS PDU in AS layer and transmitted together or inside RRC message(s) (i.e. data-over-NAS or DoNAS). For the CP solution the NAS transmission and its completion may act as trigger, as presented above, e.g. in connection with a Service Request or Control Plane Service Request message or procedure. For the UP solution, there may not be a NAS transmission or a Service Request message sent at all, thus the trigger should reflect this. In this case, according to a particular embodiment, an indication from the wireless device such as, for example, a UE, or network node such as, for example, an eNB, to MME could be used as a trigger. The indication would inform MME that a data transmission using UP (e.g. over a data radio bearer (DRB)) has been completed and the wireless device has been either release or did not complete the transition to RRC_CONNECTED.

Figure 7:
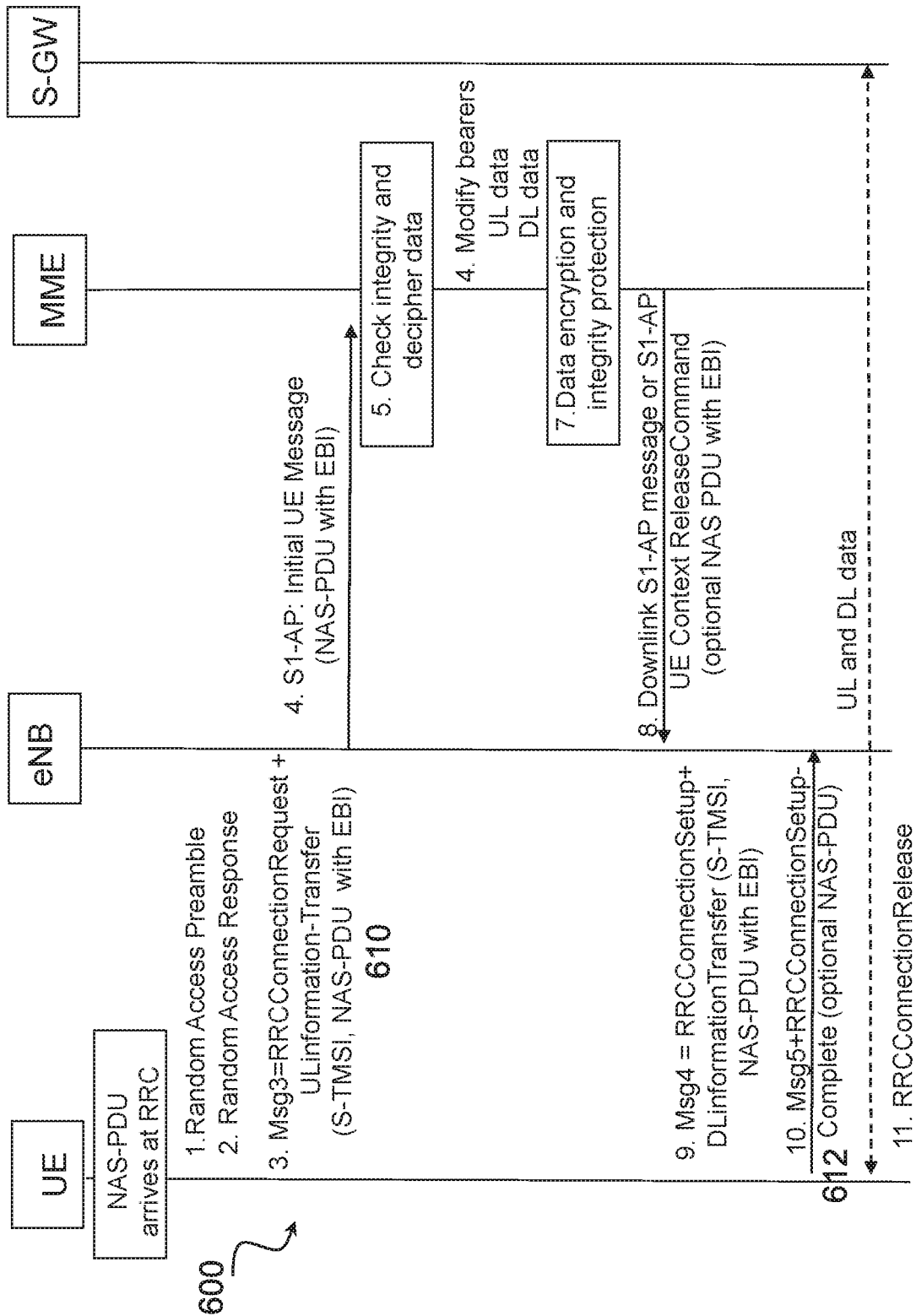
FIG. 7 illustrates an example signaling diagram for mobile-originated EDT for CLoT UP Optimization, according to certain embodiments.

In certain embodiments, the solution may include an indication in a message 3 (msg3) corresponding to a first grant if the wireless device 110 will use a second optional msg3 corresponding to a second grant. FIG. 7 an example signaling diagram 600 for mobile-originated EDT for CIoT UP Optimization, according to certain embodiments. As depicted, an indication in a message 3 (msg3) 610 corresponding to a first grant indicates if the wireless device 110 will use a second optional msg3 612 corresponding to a second grant. For example, msg3 610 from the UE to eNB may include a RRC Connection Request and UL information transfer (S-TMSI, estCause, and NAS-DU with EBI). The NAS-PDU with EBI may be transmitted from eNB to MME at 615. Thereafter, the MME may transmit a downlink S1-AP message or S1-AP UE Context Release command with optional NAS PDU with EBI at 620. At 625, an RRCConnection Setup message is transmitted from the eNB to the UE. This message may include DLInformationTransfer (S-TMSI, NAS-PDU with EBI). Finally, at 630, an RRC Connection Setup Complete message is transmitted from the UE to the eNB with optional NAS-PDU.

Figure 8:
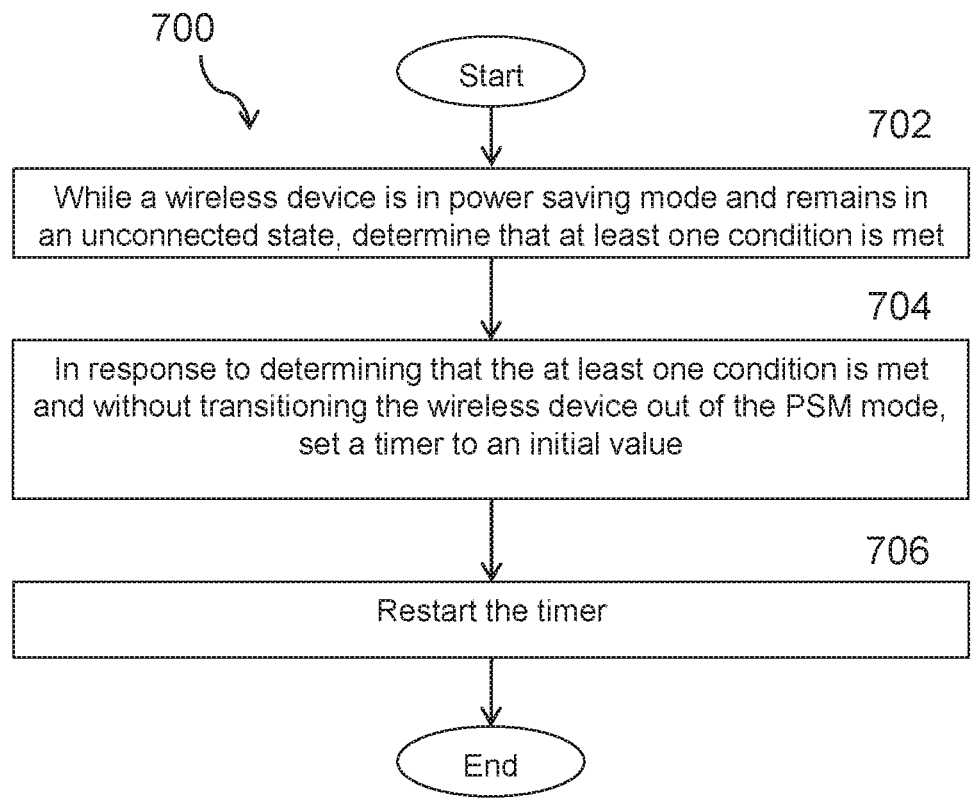
FIG. 8 illustrates an example method by a wireless device providing an idle EDT solution that accommodates PSM, according to certain embodiments.

FIG. 8 illustrates an example method 700 by a wireless device providing an idle EDT solution that accommodates PSM, according to certain embodiments. The method may begin at step 702 when, while a wireless device 110 is in PSM and remains in an unconnected state, it is determined that at least one condition is met. In a particular embodiment, the PSM is an RRC_IDLE mode. In various embodiments, the method may be performed by a network node, a mobile management entity, and/or a wireless device.

At step 704, in response to determining that the at least one condition is met and without transitioning the wireless device out of the PSM mode, a timer is set to an initial value. In a particular embodiment, the timer may be a T3412 timer and the at least one condition may be met upon a successful completion of a NAS transmission where no EMM connection is established. Alternatively, the at least one condition may be met when a service request procedure is successfully completed and an indication by the lower layers that an RRC connection has been released is detected and/or when lower layers indicate that an EDT has completed and the transition to RRC_CONNECTED was not completed.

In another embodiment, the timer may be a T3324 timer and the at least one condition may be met upon a successful completion of a NAS transmission where no EMM connection is established. Additionally, the timer may be stopped response to determining that a NAS transmission has been initiated but no EMM connection has been established.

In still other embodiments, the at least one condition may include:

signaling relating to an early transmission of data;

an S1 NAS signaling connection between the wireless device and a network node is set up or released;

an S1-AP 'UE context release command' is successfully transmitted or received;

a S1-AP 'initial UE message' plus a timer value is successfully transmitted or received;

a control plane service request message;

a service accept;

any step of a service request procedure;

wireless device enters or is released form any new EMM state;

a RRC resume or RRC release with suspend cause for CIoT EPS UP optimization;

an establishment or release of RRC connection for CIoT EPS UP optimization;

a release of AS for CIoT EPS UP optimization

At step 706, the timer is restarted. In a particular embodiment, for example, the timer may be reset to an initial value of zero at step 704, and the timer may count up, beginning at zero, after the timer is restarted at step 706. In another embodiment, for example, the timer may be reset to an threshold value that is greater than zero at step 704, and the timer may count down, beginning at the threshold value, after the timer is restarted at step 706.

Figure 9:
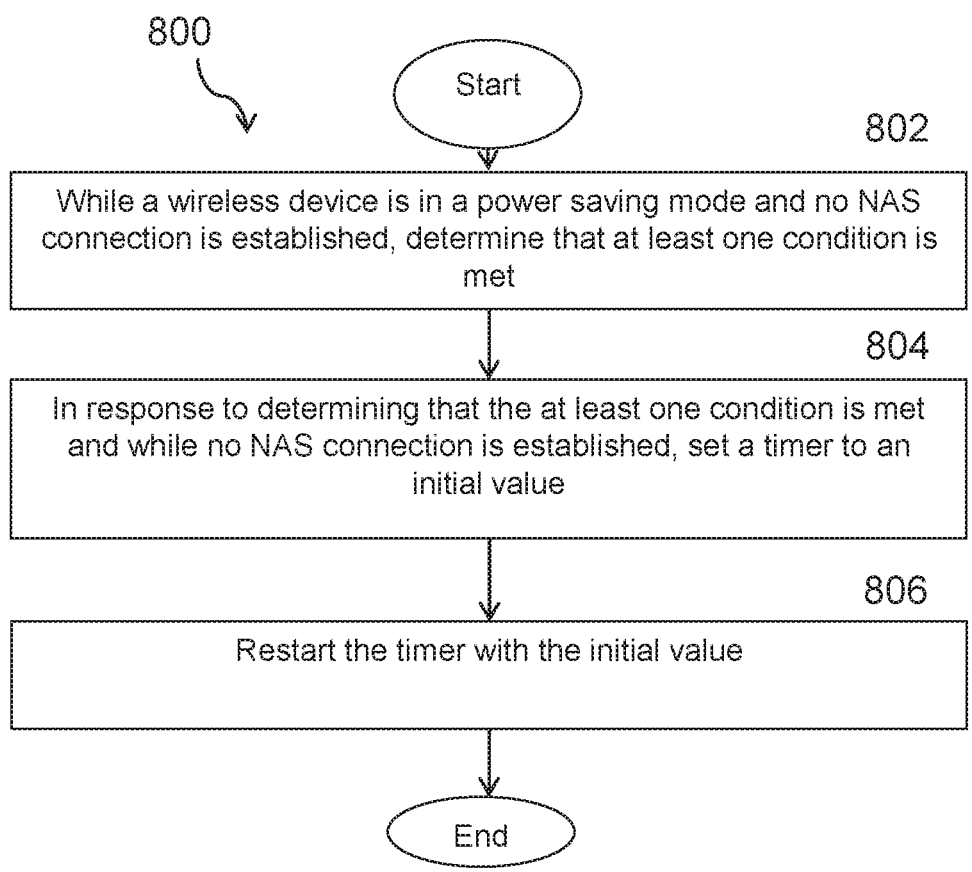
FIG. 9 illustrates an example method by a radio node providing an idle EDT solution that accommodates PSM, according to certain embodiments.

FIG. 9 illustrates another example method 800 by a radio node providing an idle EDT solution that accommodates PSM, according to certain embodiments. In a particular embodiment, the radio node is a network node 115, such as, for example, a MME. In another embodiment, the radio node is a wireless device 110 such as, for example, a UE. In a particular embodiment, the PSM is sub-mode or sub-state of a RRC_IDLE mode.

The method begins at step 802 when, while wireless device 110 is in PSM and no NAS connection is established, the radio node determines that at least one condition is met. According to certain embodiments, the wireless device is in an Evolved Packet System Mobility Management (EMM) connected mode when no NAS connection is established.

In a particular embodiment, the at least one condition is met when signaling relating to EDT occurs. For example, the timer may be a T3412 timer, and the signaling relating to the EDT may comprise an indication from lower layers that the EDT has completed and a transition to RRC_CONNECTED was not completed. As another example, the timer may be a T3412 timer, and the at least one condition may be met upon a successful completion of a NAS transmission where no NAS connection is established. As still another example, the timer may be a T3324 timer, and the at least one condition may be met upon a successful completion of a NAS transmission where no EMM connection is established.

In another particular embodiment, the at least one condition may be met during a service request procedure. For example, the timer may be a T3412 timer, and the at least one condition may be met when the service request procedure is successfully completed and an indication by the lower layers that a RRC connection has been released is detected.

In still other embodiments, the at least one condition may be met when one or more of the following scenarios is detected:
  a 'UE context release command' is successfully transmitted or received,
  an 'initial UE message' plus a timer value is successfully transmitted or received,
  a control plane service request message is successfully transmitted or received,
  a service accept is successfully transmitted or received, and/or
  the wireless device enters or is released from any new EMM state.

In yet other embodiments, the at least one condition may be associated with one or more of the following:
  a RRC resume or RRC release with suspend cause for CIoT EPS UP Optimization,
  an establishment or release of a RRC connection, and/or
  a release of AS for CIoT EPS UP optimization.

In still another particular embodiment, the at least one condition is associated with an application of a timer of fixed time offset.

At step, 804, and in response to determining that the at least one condition is met and while no NAS connection is established, wireless device 110 sets a timer to an initial value.

At step 806, wireless device 110 restarts the timer with the initial value.

In a particular embodiment, the method may further include the radio node stopping the timer in response to determining that a NAS transmission has been initiated but no NAS connection is established.

Figure 10:
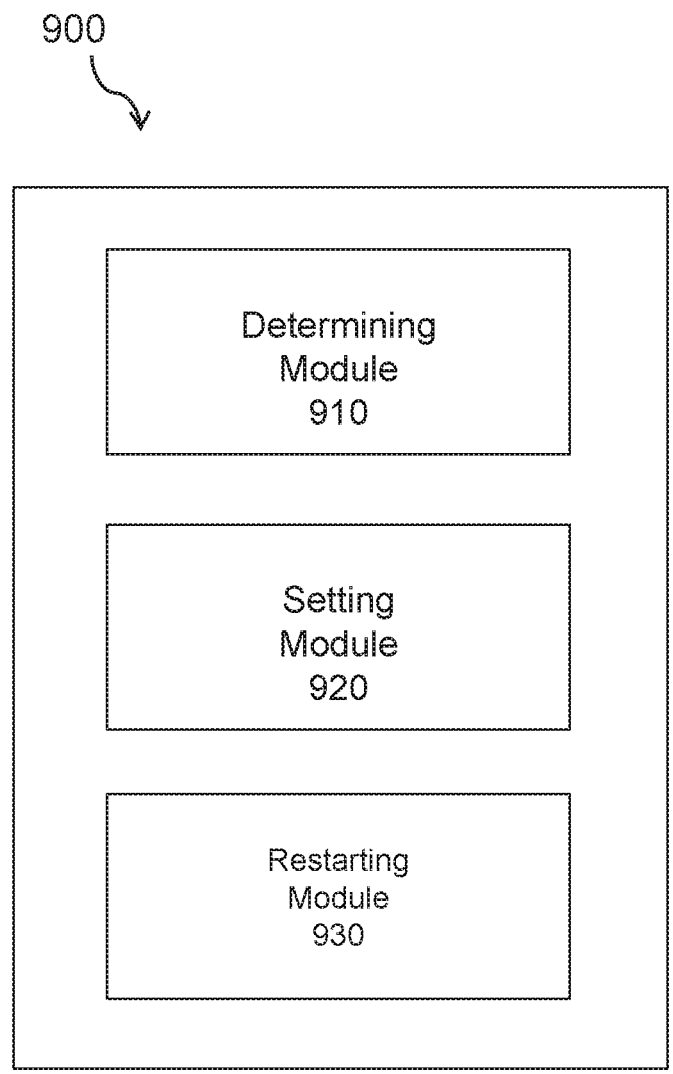
FIG. 10 illustrates an example virtual computing device providing an idle EDT solution that accommodates PSM, according to certain embodiments.
Figure 11:
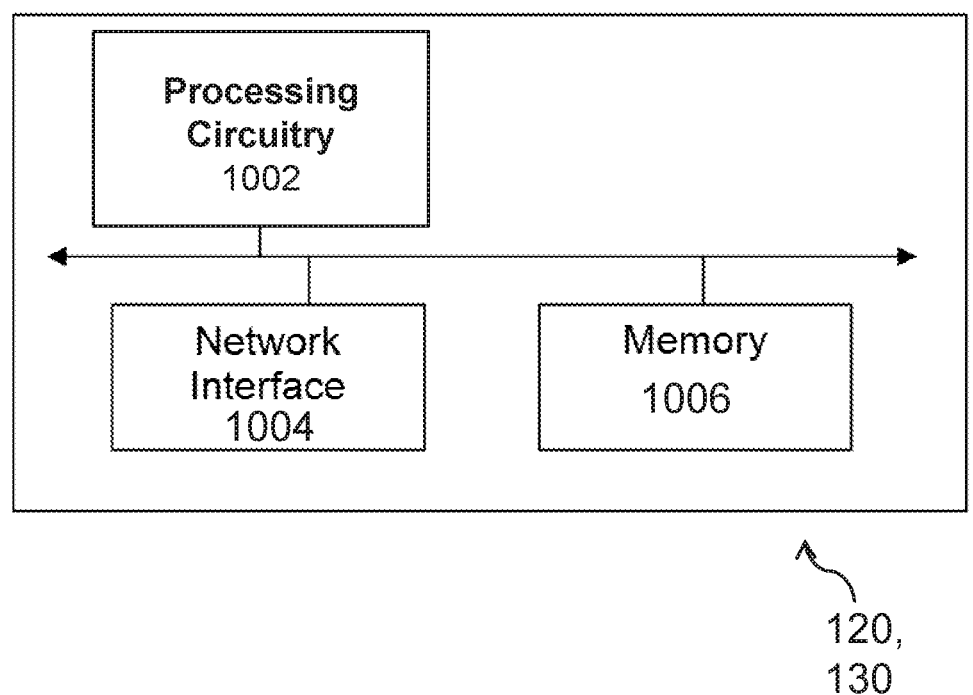
FIG. 11 illustrates an exemplary radio network controller or core network node, according to certain embodiments.

In certain embodiments, the method providing an idle EDT solution that accommodates PSM as described above may be performed by a computer networking virtual apparatus. FIG. 10 illustrates an example virtual computing device 900 providing an idle EDT solution that accommodates PSM, according to certain embodiments. In certain embodiments, virtual computing device 900 may include modules for performing steps similar to those described above with regard to the method illustrated and described in FIG. 8 or 9. For example, virtual computing device 900 may include a determining module 910, a setting module 920, a restarting module 930, and any other suitable modules providing an idle EDT solution that accommodates PSM. In some embodiments, one or more of the modules may be implemented using processing circuitry 220 of FIG. 2 or processing circuitry 320 of FIG. 3. In certain embodiments, the functions of two or more of the various modules may be combined into a single module.

The determining module 910 may perform the determining functions of virtual computing device 900. For example, in a particular embodiment, determining module 910 may determine, while a wireless device 110 is in PSM and remains in an unconnected state, that at least one condition is met. As another example, in a particular embodiment, determining module 910 may determine that at least one condition is met while wireless device 110 is in PSM and no NAS connection is established.

The setting module 920 may perform the setting functions of virtual computing device 900. For example, in a particular embodiment, setting module 920 may set a timer to an initial value in response to determining, while wireless device 110 is in PSM and remains in an unconnected state, that at least one condition is met. As another example, in a particular embodiment, setting module 920 may set a timer to an initial value in response to determining, while wireless device 110 is in PSM and no NAS connection is established, that at least one condition is met.

The restarting module 930 may perform certain of the restarting functions of virtual computing device 900. For example, in a particular embodiment, restarting module 930 may restart the timer. As another example, in a particular embodiment, restarting module 930 may restart the timer with the initial value.

Other embodiments of virtual computing device 900 may include additional components beyond those shown in FIG. 9 that may be responsible for providing certain aspects of the radio node's functionality, including any of the functionality described above and/or any additional functionality (including any functionality necessary to support the solutions described above). The various different types of radio nodes may include components having the same physical hardware but configured (e.g., via programming) to support different radio access technologies, or may represent partly or entirely different physical components.

FIG. 10 illustrates an exemplary radio network controller or core network node, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 120, 130 includes processing circuitry 920, memory 930, and network interface 940. In some embodiments, processing circuitry 920 executes instructions to provide some or all of the functionality described above as being provided by the network node, memory 930 stores the instructions executed by processing circuitry 920, and network interface 940 communicates signals to any suitable node, such as a gateway, switch, router, Internet, Public Switched Telephone Network (PSTN), network nodes 115, radio network controllers or core network nodes, etc.

Processing circuitry 920 may include any suitable combination of hardware and software implemented in one or more modules to execute instructions and manipulate data to perform some or all of the described functions of the radio network controller or core network node 900. In some embodiments, processing circuitry 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processing circuitry 920 and may refer to any suitable device operable to receive input for the network node, send output from the network node, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of the network node may include additional components beyond those shown in FIG. 10 that may be responsible for providing certain aspects of the network node's functionality, including any of the functionality described above and/or any additional functionality (including any functionality necessary to support the solution described above).

EXAMPLE EMBODIMENTS

According to certain embodiments, a method may include:
while a wireless device is in PSM and remains in an unconnected state, determining that at least one condition is met;
in response to determining that the at least one condition is met and without transitioning the wireless device out of the PSM mode, setting a timer to an initial value; and
restarting the timer;
optionally, the timer is a T3412 timer and the at least one condition is met upon a successful completion of a NAS transmission where no EMM connection is established;
optionally, the timer is a T3324 timer and the at least one condition is met upon a successful completion of a NAS transmission where no EMM connection is established;
optionally, the method further comprises stopping the timer in response to determining that a NAS transmission has been initiated but no EMM connection has been established;
optionally, the timer is a T3412 timer and the at least one condition is met when a service request procedure is successfully completed and an indication by the lower layers that an RRC connection has been released is detected;
optionally, the timer is a T3412 timer and the at least one condition is met when lower layers indicate that an EDT has completed and the transition to RRC_CONNECTED was not completed;
optionally, the at least one condition is met when signaling relating to an early transmission of data occurs;
optionally, the at least one condition is met when an S1 NAS signaling connection between the wireless device and a network node is set up or released;
optionally, the at least one condition is associated with an S1-AP 'UE context release command' is successfully transmitted or received;
optionally, the at least one condition is met when a S1-AP 'initial UE message' plus a timer value is successfully transmitted or received;
optionally, the at least one condition is associated with a control plane service request message;
optionally, the at least one condition is associated with a service accept;
optionally, the at least one condition is met during any step of a service request procedure;
optionally, the at least one condition is met when the wireless device enters or is released form any new EMM state;
optionally, the at least one condition is associated with a RRC resume or
RRC release with suspend cause for CIoT EPS UP Optimization;
optionally, the at least one condition is associated with an establishment or release of RRC connection for CIoT EPS UP optimization;
optionally, the at least one condition is associated with a release of AS for CIoT EPS UP optimization;
optionally, the at least one condition is associated with an application of a timer of fixed time offset to any of the above;
optionally, the PSM is an RRC_IDLE mode;
optionally, the method is performed by a network node;
optionally, the network node comprises a mobile management entity.
optionally, the method is by a wireless device;
According to certain embodiments, a radio node may include:
memory storing instructions; and
processing circuitry operable to execute the instructions to cause the radio node to:
while a wireless device is in PSM and remains in an unconnected state, determine that at least one condition is met;
in response to determining that the at least one condition is met and without transitioning the wireless device out of the PSM mode, set a timer to an initial value; and
restart the timer;
optionally, the timer is a T3412 timer and the at least one condition is met upon a successful completion of a NAS transmission where no EMM connection is established;
optionally, the timer is a T3324 timer and the at least one condition is met upon a successful completion of a NAS transmission where no EMM connection is established;

optionally, the method further comprises stopping the timer in response to determining that a NAS transmission has been initiated but no EMM connection has been established;

optionally, the timer is a T3412 timer and the at least one condition is met when a service request procedure is successfully completed and an indication by the lower layers that an RRC connection has been released is detected;

optionally, the timer is a T3412 timer and the at least one condition is met when lower layers indicate that an EDT has completed and the transition to RRC_CONNECTED was not completed;

optionally, the at least one condition is met when signaling relating to an early transmission of data occurs;

optionally, the at least one condition is met when an S1 NAS signaling connection between the wireless device and a network node is set up or released;

optionally, the at least one condition is associated with an S1-AP 'UE context release command' is successfully transmitted or received;

optionally, the at least one condition is met when a S1-AP 'initial UE message' plus a timer value is successfully transmitted or received;

optionally, the at least one condition is associated with a control plane service request message;

optionally, the at least one condition is associated with a service accept;

optionally, the at least one condition is met during any step of a service request procedure;

optionally, the at least one condition is met when the wireless device enters or is released form any new EMM state;

optionally, the at least one condition is associated with a RRC resume or RRC release with suspend cause for CIoT EPS UP Optimization;

optionally, the at least one condition is associated with an establishment or release of RRC connection for CIoT EPS UP optimization;

optionally, the at least one condition is associated with a release of AS for CIoT EPS UP optimization;

optionally, the at least one condition is associated with an application of a timer of fixed time offset to any of the above;

optionally, the PSM is an RRC_IDLE mode;

optionally, the method is performed by a network node;

optionally, the network node comprises a mobile management entity.

optionally, the method is by a wireless device;

Certain embodiments of the present disclosure may provide one or more technical advantages. For example, certain embodiments may provide an idle early data solution that works in combination with power-saving mode.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:

| Abbreviation | Explanation |
| --- | --- |
| 3GPP | $3^{rd}$ Generation Partnership Project |
| BI | Backoff Indicator |
| BSR | Buffer Status Report |
| Cat-M1 | Category M1 |
| Cat-M2 | Category M2 |
| CE | Coverage Enhanced/Enhancement |
| DL | Downlink |
| eMTC | enhanced Machine-Type Communications |
| eNB | Evolved NodeB |
| IoT | Internet of Things |
| LTE | Long-Term Evolution |
| MAC | Medium Access Control |
| NAS | Non-Access Stratum |
| NB-IoT | Narrowband Internet of Things |
| M2M | Machine-to-Machine |
| MTC | Machine-Type Communications |
| PDU | Protocol Data Unit |
| (N)PRACH | (Narrowband) Physical Random Access Channel |
| PRB | Physical Resource Block |
| PSM | Power-Saving Mode |
| RA | Random Access |
| RAPID | Random Access Preamble IDentifier |
| RAR | Random Access Response |
| RNTI | Radio Network Temporary Identifier |
| RRC | Radio Resource Control (protocol) |
| TBS | Transport Block Size |
| UE | User Equipment |
| UL | Uplink |
| WI | Work Item |

The invention claimed is:

1. A method comprising:
   while a wireless device is in a power saving mode (PSM) and no non-access stratum (NAS) signaling connection is established, determining that at least one condition is met;
   in response to determining that the at least one condition is met and while no NAS signaling connection is established, setting a timer to an initial value; and
   restarting the timer with the initial value, and
   wherein the at least one condition is met upon a successful completion of a NAS transmission where no NAS signaling connection is established.

2. The method of claim 1, wherein the at least one condition is met when signaling relating to an early data transmission (EDT) occurs.

3. The method of claim 2, wherein:
   the timer is a T3412 timer, and
   the signaling relating to the EDT comprises an indication from lower layers that the EDT has completed and a transition to RRC_CONNECTED was not completed.

4. The method of claim 1, wherein the timer is a T3412 timer.

5. The method of claim 1, wherein the timer is a T3324 timer.

6. A radio node comprising:
memory storing instructions; and
processing circuitry operable to execute the instructions to cause the radio node to:
while a wireless device is in a power saving mode (PSM) and no network access stratum (NAS) signaling connection is established, determine that at least one condition is met;
in response to determining that the at least one condition is met and while no NAS signaling connection is established, set a timer to an initial value; and
restart the timer at the initial value, and
wherein the at least one condition is met upon a successful completion of a NAS transmission where no NAS signaling connection is established.

7. The radio node of claim 6, wherein the at least one condition is met when signaling relating to an early data transmission (EDT) occurs.

8. The radio node of claim 7, wherein:
the timer is a T3412 timer, and
the signaling relating to the EDT comprises an indication from lower layers that the EDT has completed and a transition to RRC_CONNECTED was not completed.

9. The radio node of claim 6, wherein the timer is a T3412 timer.

10. The radio node of claim 6, wherein the timer is a T3324 timer.

11. The radio node of claim 6, wherein the at least one condition is met during a service request procedure.

12. The radio node of claim 11, wherein the timer is a T3412 timer and the at least one condition is met when the service request procedure is successfully completed and an indication by the lower layers that a radio resource control (RRC) connection has been released is detected.

13. The radio node of claim 6, wherein the wireless device is in an Evolved Packet System Mobility Management (EMM) connected mode when no NAS signaling connection is established.

14. The radio node of claim 6, wherein the at least one condition is associated with an 'UE context release command' is successfully transmitted or received.

15. The radio node of claim 6, wherein the at least one condition is met when an 'initial UE message' plus a timer value is successfully transmitted or received.

16. The radio node of claim 6, wherein the at least one condition is associated with a control plane service request message.

17. The radio node of claim 6, wherein the at least one condition is associated with a service accept.

18. The radio node of claim 6, wherein the at least one condition is met when the wireless device enters or is released from any new EMM state.

19. The radio node of claim 6, wherein the at least one condition is associated with a radio resource control (RRC) resume or RRC release with suspend cause for Cellular Internet of Things user plane evolved packet system (CIoT EPS UP EPS) Optimization.

20. The radio node of claim 6, wherein the at least one condition is associated with an establishment or release of a radio resource control (RRC) connection.

21. The radio node of claim 6, wherein the at least one condition is associated with a release of access stratum (AS) for CIoT EPS UP optimization.

22. The radio node of claim 6, wherein the at least one condition is associated with an application of a timer of fixed time offset.

23. The radio node of claim 6, wherein the PSM is sub-mode of a radio resource control idle (RRC_IDLE) mode.

24. The radio node of claim 6, wherein the radio node comprises a network node.

25. The radio node of claim 24, wherein the network node comprises a mobility management entity (MME).

26. The radio node of claim 6, wherein the radio node comprises a wireless device.

* * * * *